No. 759,074. PATENTED MAY 3, 1904.
P. J. & R. H. CAHILL.
LATHE.
APPLICATION FILED MAY 19, 1903.
NO MODEL. 2 SHEETS—SHEET 1.
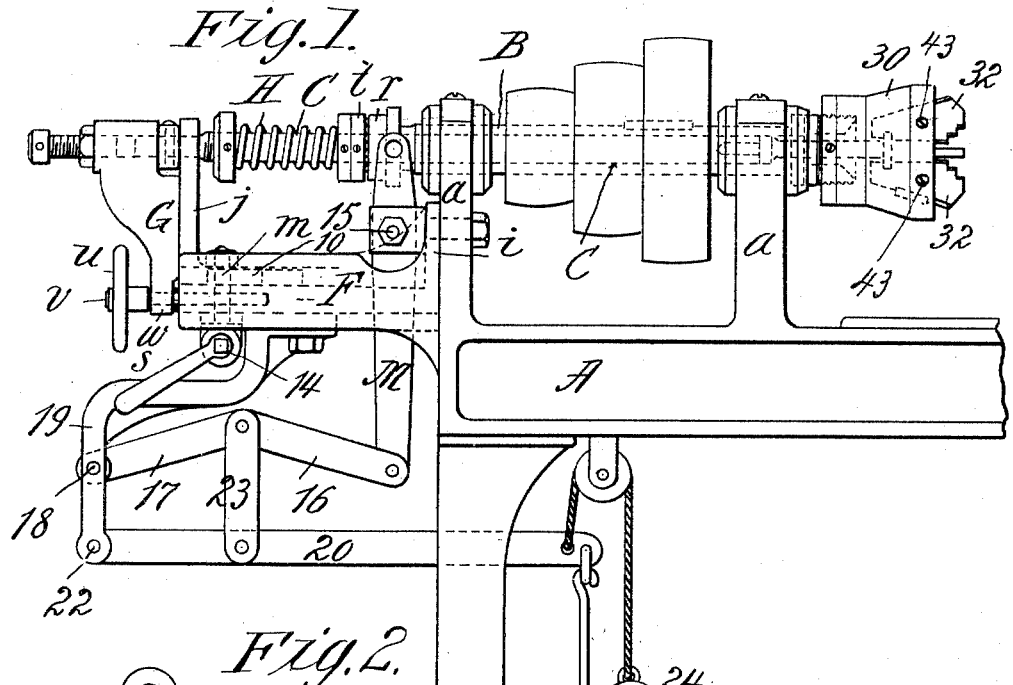
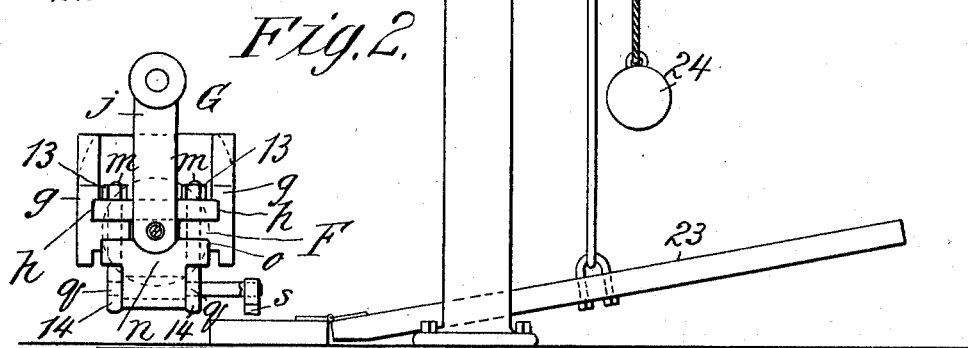
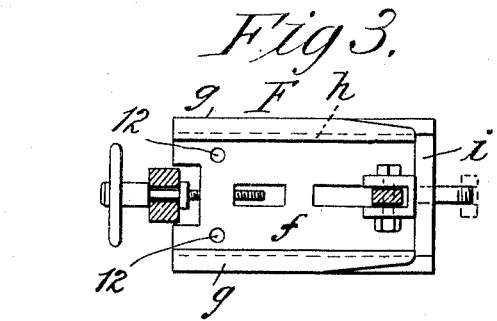
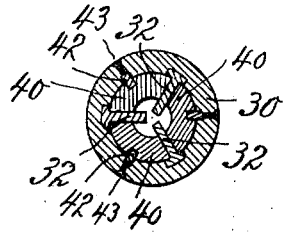
Witnesses:
J. D. Garfield
M. G. Crosier
Inventors:
Patrick J. Cahill
Richard H. Cahill
by Wm. H. Bellows
Attorney.

No. 759,074. PATENTED MAY 3, 1904.
P. J. & R. H. CAHILL.
LATHE.
APPLICATION FILED MAY 19, 1903.
NO MODEL. 2 SHEETS—SHEET 2.
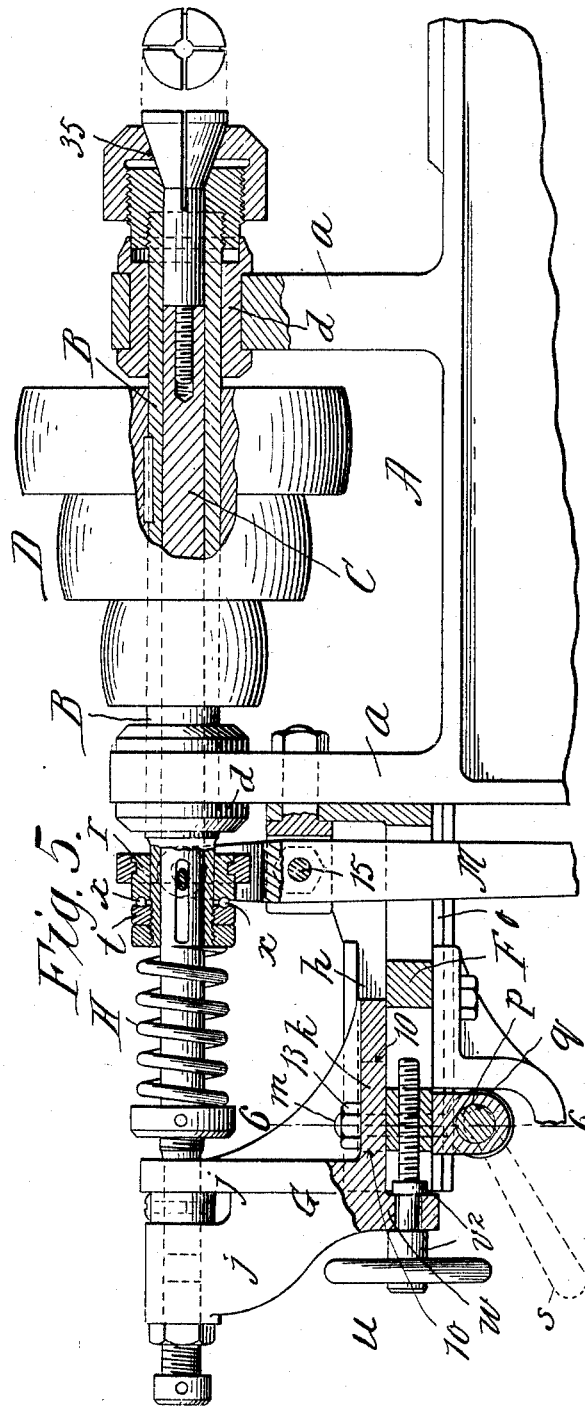
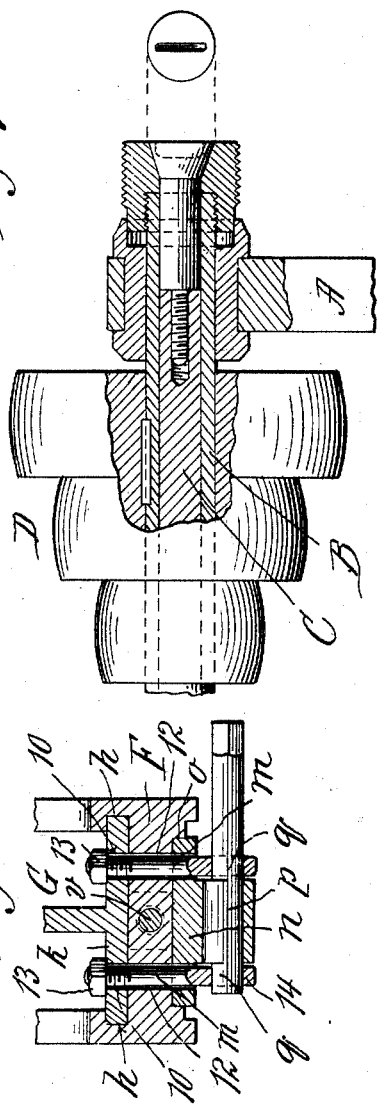
Witnesses:
J. D. Garfield
M. S. Crosier
Inventors:
Patrick J. Cahill
Richard H. Cahill
by Wm. H. Bellamy
Attorney.

No. 759,074. Patented May 3, 1904.

UNITED STATES PATENT OFFICE.

PATRICK J. CAHILL AND RICHARD H. CAHILL, OF LEEDS, MASSACHUSETTS.

LATHE.

SPECIFICATION forming part of Letters Patent No. 759,074, dated May 3, 1904.

Application filed May 19, 1903. Serial No. 157,752. (No model.)

*To all whom it may concern:*

Be it known that we, PATRICK J. CAHILL and RICHARD H. CAHILL, citizens of the United States of America, and residents of Leeds, in the county of Hampshire and State of Massachusetts, have invented certain new and useful Improvements in Lathes, of which the following is a full, clear, and exact description.

This invention relates to improvements in lathes for special work of the general character shown and described in Letters Patent of the United States issued to P. J. Cahill September 27, 1887, No. 370,604, such lathe being adapted for adjustment for receiving in the chuck thereof pieces or work of one size to be successively turned, finished, or otherwise operated on, and possessing capabilities for extremely quick opening and closing of the chuck for the removal of a finished piece and the reception of a new piece, whereby the maximum amount of work may be performed in a given time. In this character of lathe there is a chuck-spindle surrounded by a rotatable sleeve, the spindle being normally stationary as regards any axial motion, while the sleeve is longitudinally movable back and forth on the spindle, has coöperative action with the spindle for the opening and closing movements of the chuck, and has combined therewith means for forcing the sleeve endwise for opening the chuck while the reversed and closing endwise movement is under the reaction of a sufficiently powerful spiral spring. Inasmuch as the normally stationary chuck-spindle is mounted in a bracket having a sliding base at the end portion of the lathe opposite from that at which the chuck is located, which bracket may be adjusted longitudinally to change the relations between the extremity of the spindle and the chuck-jaws, so that the endwise movements of the one relatively to the other will open and close the chuck within the proper range of such movements to accord with the work to be received and discharged, and inasmuch as the endwise movement of the sleeve for the opening of the chuck is repeatedly resisted by the upstanding member of the aforementioned bracket, which thrust thereagainst imposes considerable leverage against such bracket, it has become very desirable to provide novel means and arrangements for the support of the bracket and the confinement thereof immovably after adjustment in any of its required set positions, and means to this end constitutes one portion of the present invention.

The invention furthermore consists in constructions and combinations of parts which will be hereinafter pointed out, and set forth in the claims.

The improved lathe is illustrated in the accompanying drawings, in which—

Figure 1 is a side elevation. Fig. 2 is a rear end view showing a portion of the lathe-bed extension, the adjustable bracket, and the means for the confinement of the bracket immovably relatively to the lathe-bed extension. Fig. 3 is a plan view of the lathe-bed extension with some parts adjacent thereto in horizontal section. Fig. 4 is a cross-sectional view through one form of chuck which is used to advantage on this lathe. Fig. 5 is in part a side elevation and in part a central longitudinal section, on a larger scale, of the principal working portions of the lathe. Fig. 6 is a vertical cross-sectional view on lines 6 6, Fig. 5. Fig. 7 is a central view through portions of the lathe at the chuck-receiving end thereof.

Similar characters of reference indicate corresponding parts in all of the views.

In the drawings, A represents the supporting structure, including the bed of the lathe, having the upstanding supports $a\ a$ for the rotary chuck-carrying sleeve B and the chuck-spindle C, the sleeve being slidable longitudinally through its journals $d$ and having the driving-pulleys D thereon, as usual.

F represents the lathe-bed extension, the same comprising a base member $f$, opposite upstanding side walls $g\ g$, having grooves or ways $h\ h$ within their inner sides, and the vertical end member $i$, which is bolted immovably to one of the journal-constituting uprights $a$ of the main bed.

G represents the bracket in the upstanding member $j$, of which the adjacent end of the chuck-spindle C has engagement and support in substantially the manner shown in the aforementioned patent. The base k of the bracket G has the opposite edges thereof in engagement in the aforementioned grooveways h h of the lathe-bed extension. The base of the said bracket G has longitudinally-ranging slots 10 10 vertically through it, and the adjacent portion of the lathe-bed extension has vertical holes 12 12, through which holes and slots are passed the shanks of bolts m m, which receive nuts 13, constituting heads, in substance, at their upper threaded extremities and which have eyes 14 at the lower ends, portions of the bolts adjacent the eyes and which are below the lathe-bed extension extending through perforations therefor in a block or saddle n, which is fitted in a sufficiently wide groove or rabbet o therefor in the under side of the lathe-bed extension. The said saddle has a circular horizontal transverse bore or bearing therein for a cylindrical portion p of a shaft, which has endwise beyond such cylindrical portion the eccentric cam portions q, closely encircled by the eyes of the aforementioned bolts n, and the shaft is suitably extended and has the operating-lever handle s. The bracket G being clamped and confined on the lathe-bed extension by the devices just described maintains the lathe-chuck spindle C always, until the bracket is moved longitudinally, in its invariable position relatively to the sleeve B, which has the back-and-forth motion as imparted thereto by the yoke-ended lever M, which engages the groove-collar r of the sleeve, such lever being intermediately pivoted at 15 and having at its lower extremity the connection therewith of one member, 16, of the toggle, the other toggle member, 17, being pivoted at 18 to a depending support 19, affixed to the lathe-bed extension, and the lever 20 has pivotal connection also at 22 with said support 19, and the link 23 is pivoted to the adjoined ends of the toggle and to an intermediate part of said lever 20. The treadle-lever 23' is linked to the lever, and this mechanism has the counterbalancing-weight 24 and sheave-guided cord in connection therewith. The depression of the treadle-lever 23 causes, through the connections mentioned, the forcing leftward of the collar r, which by having, in substance, an abutment against the nut t on the end of the sleeve moves the sleeve relatively to the chuck-spindle C against and compressing the spiral spring H, such movement of the sleeve relatively to the spindle resulting in the opening of the chuck, the parts at the chuck end of the lathe being relatively formed and arranged to this end, such formations and arrangements being various in different cases, according to the type of chuck used. The depression of the treadle-lever causing the opening of the chuck, the work may be inserted therein or removed thereupon, and the release of the pressure on the treadle-lever leaves the spring H to react, insuring the closing of the chuck about the work.

It will be appreciated that the frequently-repeated depressions of the treadle-lever and the resulting impact brought substantially against the upper part of the bracket G imparts a considerable leverage force on the upstanding member of the bracket, tending to rock it at its base, the result of which would be to throw the spindle out of true relatively to the sleeve and the sleeve out of true relatively to its journal-bearings and to in some extent throw the chuck and work out of its proper position concentric with the true axis of rotation; but the said bracket, which resists the impact aforementioned, having its base marginally engaged in the opposite ways h and held firmly against undue change of position defeats the tendency, due to the leverage action against the upper part of the bracket stated, to throw the parts out of the positions of required maintenance.

By changing the position of the chuck-spindle, moving it bodily endwise in either direction, the chuck will correspondingly be opened more or less each time the treadle-lever is operated, the range of its opening and closing movements being of course changed, and this is, as understood, readily performed by merely swinging the handle-lever s, so that the eccentrics g g permit the clamping-bolts to unclamp the base of the bracket, whereupon the turning of the handle-wheel u of the screw-shaft v endwise moves the bracket G and chuck-spindle C, the threaded portion of the shaft-screw engaging through the suitably-tapped portion of the lathe-bed extension, while the hubs or collars $v^2$ engage at opposite sides of the depending and perforated lug w of the bracket.

Inasmuch as the yoke-encircled collar r about the sleeve B is advantageously non-rotatable and has its thrust in the direction of the axis against the adjacent end t, the faces of these parts are grooved to constitute a raceway for the balls x, which are interposed for the avoidance of friction, the chuck-spindle and sleeve usually being rotatable in unison, although the spindle is not endwise movable during the time any run of work is being done in the lathe after the same has been properly adjusted therefor.

In Fig. 1 a form of chuck is shown in which the chuck-head 30 has tapered internal ways or faces for the radially-movable chuck-jaws 32, the notched inner portions of the jaws engaging a flange of the spindle, while the cam action of the endwise-movable chuck-head imparts the opening and closing movements to the jaws. In this chuck the internal ways radially formed within the annular chuck-body are constituted by the suitably-separated walls of segmental sections 40, fitted within the outer flaring and annular body or casing of the chuck, and inasmuch as the jaws of the chuck may be accidentally struck in a manner to force them and the segments 40, rotationally displacing them, keys 42 are forced into grooves therefor in the adjoining walls of the chuck-body and the segments 40, said keys being held against loosening by set-screws 43, all as shown in Fig. 4.

In Fig. 5 a split chuck is shown, the same being attached at the end of the spindle C, having the exterior of its jaws tapered and coacted with by the flaring apertured annular member 35, carried as one with the endwise-movable sleeve.

In Fig. 7 the parts are shown as adapted for the reception, screw-engaged on the extremity or fitting at the end of the sleeve, of what is understood as a "blind chuck"—that is, one in which there is not necessarily any expanding and contracting movements of the work-encircling portions of the chuck.

Having thus described our invention, what we claim, and desire to secure by Letters Patent, is—

1. In a device of the character described, the combination of a main shaft, a sleeve loosely mounted on the shaft, a chuck connected with the sleeve, a spring connected between the sleeve and shaft, a lever pivoted on the frame of the device and connected with the sleeve at one end, toggle-joint members connected with the other end of said lever, and operating means arranged to operate the lever through the toggle members.

2. In a device of the character described, the combination of a main shaft, a sleeve loosely mounted on the shaft, a chuck connected with the sleeve, a spring connected between the sleeve and shaft, a lever pivoted on the frame of the device and connected at one end with the sleeve, an intermediately-pivoted lever engaging said sleeve, a depending support, a second lever pivoted on said support, means for operating said latter lever, toggle members pivoted respectively to the support and to the first-mentioned lever, and a link pivotally connected with the toggle members and with the said second lever.

3. In a device of the character described, the combination of a bed having an extension with upright side members that have grooves in the opposite walls, a bracket having an upright member, the base of the bracket being supported on the extension and engaging the same at its grooved portions, the bracket having longitudinal slots therein, a block located beneath the extension, a spindle journaled in the block and having two cam portions, eyebolts journaled in the cams and extending up through the slots in the extension, heads on the bolts resting on the extension, a handle on the spindle, a screw journaled in the bracket and threaded into the block, a main shaft having a thrust-bearing in the bracket, a sleeve loosely mounted on the shaft, a chuck member connected with the sleeve, a spring connected between the shaft and the sleeve, a lever pivoted on the frame of the device and connected at one end with the sleeve, toggle-joint members connected with the other end of said lever, and operating means arranged to actuate the lever through the toggle members.

Signed by us at Springfield, Massachusetts, in presence of two subscribing witnesses.

PATRICK J. CAHILL.
R. H. CAHILL.

Witnesses:
WM. S. BELLOWS,
A. V. LEAHY.